United States Patent
Simons et al.

(10) Patent No.: US 7,025,449 B2
(45) Date of Patent: *Apr. 11, 2006

(54) METHOD AND COMPOSITION FOR THE PREPARATION OF A PRINTING PLATE

(75) Inventors: Michael J. Simons, Middlesex (GB); Huijuan D. Chen, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/628,639

(22) Filed: Jul. 28, 2003

(65) Prior Publication Data

US 2004/0021707 A1 Feb. 5, 2004

(30) Foreign Application Priority Data

Aug. 2, 2002 (GB) ..................... 0217978

(51) Int. Cl.
*B41J 2/17* (2006.01)
*B41J 2/01* (2006.01)

(52) U.S. Cl. .................. 347/96; 347/101; 101/457

(58) Field of Classification Search ............... 347/96, 347/105, 101, 100, 109, 108, 104, 8, 95; 428/195, 32.1; 101/466, 457, 462, 65
See application file for complete search history.

(56) References Cited

U.S. PATENT DOCUMENTS 4,783,497 A    11/1988   Thompson
6,025,022 A *  2/2000   Matzinger ............. 427/256
6,131,514 A *  10/2000  Simons ................. 101/466

FOREIGN PATENT DOCUMENTS

| EP | 0803554 A2 | 10/1997 |
| EP | 803554 A2 * | 10/1997 |
| EP | 0 882 584 A1 | 12/1998 |
| EP | 1347023 A1 | 9/2003 |
| JP | 53-15905 | 2/1978 |
| WO | WO/0037254 | 6/2000 |
| WO | WO/0037261 | 6/2000 |

OTHER PUBLICATIONS

JP Abstract 56-105960.

* cited by examiner

*Primary Examiner*—Manish S. Shah
(74) *Attorney, Agent, or Firm*—Chris P. Konkol

(57) ABSTRACT

The invention relates to a method of preparing a printing plate includes ink-jet printing an oleophilic image on a surface of a support by applying to the support an aqueous solution or aqueous colloidal dispersion of a polymer having water-solubilising groups wherein the water-solubilising groups interact with the surface of the support thereby binding the polymer to the support and rendering the polymer insoluble, wherein the aqueous solution or aqueous colloidal dispersion of polymer comprises pigment particles dispersed therein.

The invention further relates to a composition suitable for the preparation of a printing plate by inkjet printing including an aqueous solution or aqueous colloidal dispersion of a polymer having water-solubilising groups characterised in that said aqueous solution or aqueous colloidal dispersion further includes pigment particles dispersed therein.

14 Claims, No Drawings

METHOD AND COMPOSITION FOR THE PREPARATION OF A PRINTING PLATE

CROSS REFERENCE TO RELATED APPLICATIONS

Reference is made to commonly-assigned and copending U.S. patent application Ser. No. 10/628,853, entitled METHOD FOR THE PREPARATION OF A PRINTING PLATE by Michael J. Simons et al. and Ser. No. 10/628,192, entitled METHOD AND SUBSTRATE FOR THE PREPARATION OF A PRINTING PLATE by Michael J. Simons, both filed herewith, the disclosure(s) of which are incorporated herein.

FIELD OF THE INVENTION

This invention relates to a method and composition for the preparation of a printing plate and to a printing plate prepared by the method.

BACKGROUND OF THE INVENTION

Printing plates suitable for offset lithographic printing are known which comprise a support having non-image areas which are hydrophilic and image areas which are hydrophobic and ink-receptive.

The art of lithographic printing is based upon the immiscibility of oil and water, wherein the oily material or ink is preferentially retained by the image area and water or fount (or fountain) solution is preferentially retained by the non-image area. When a suitably prepared surface is moistened with water and an ink is then applied, the background or non-image area retains the water and repels the ink while the image area accepts the ink and repels the water. The ink on the image area is then transferred to the surface of a material upon which the image is to be reproduced, such as paper or cloth.

Commonly the ink is transferred to an intermediate material called the blanket, which in turn transfers the ink to the surface of the material upon which the image is to be reproduced.

Inkjetting is a non-impact method for producing images by the deposition of ink droplets on a substrate in response to digital signals.

JP-A-53015905 describes the preparation of a printing plate by inkjetting an alcohol-soluble resin in an organic solvent onto an aluminium printing plate.

JP-A-56105960 describes the formation of a printing plate by inkjetting onto a support, e.g. an anodized aluminium plate, an ink capable of forming an oleophilic image and containing a hardening substance such as epoxy-soybean oil, together with benzoyl peroxide or a photo-hardening substance such as an unsaturated polyester.

EP-A-0 882 584 describes a method of preparing a printing plate comprising producing an oleophilic image on the surface of a support by inkjet printing the image on the surface using an aqueous solution of a salt of a hydrophobic organic acid, e.g. oleic acid.

U.S. Pat. No. 6,131,514 describes a method of preparing a printing plate comprising producing an oleophilic image on the surface of a support by inkjet printing the image on the surface using an aqueous solution or aqueous colloidal dispersion of a polymer bearing water-solubilising groups wherein the water-solubilising groups interact with the surface of the support thereby binding the polymer to the support and rendering the polymer insoluble.

WO/0037261 describes a method for the preparation of a lithographic printing plate which comprises forming an oleophilic image on the surface of a hydrophilic support by depositing by inkjetting the image on the surface using an aqueous dispersion of an oligomer having in the molecule both hydrophilic and hydrophobic groups.

WO/0037254 describes a method for the preparation of a lithographic printing plate which comprises forming an oleophilic image on the surface of a hydrophilic support by depositing by inkjetting the image on the surface using an aqueous emulsion of an organic film-forming polymer which has been prepared by emulsion polymerisation, whereby the polymer adheres to the surface of the printing plate forming an oleophilic film.

U.S. Pat. No. 6,025,022 discloses an inkjet printing system consisting of at least two reactive components, i.e. an aziridine and a polymer having attached at least one functional group that is reactive with an aziridine. A method of preparing a printing plate is described wherein (1) a glass plate is coated with a composition comprising a colorant, a carboxylic acid-functionalized polymer, a catalyst and a carrier medium and (2) an image is printed on the coated plate with a composition comprising an aziridine and a carrier medium.

PROBLEM TO BE SOLVED

The methods of the prior art which use aqueous writing fluids provide simple, rapid and comparatively low cost ways of forming lithographic printing plates and doing lithographic printing. The number of prints or impressions however given by a printing plate is an important feature of its performance. The method of the invention can unexpectedly improve the number of impressions given by printing plates formed by inkjetting aqueous solutions or dispersions of negatively charged polymers onto a hydrophilic substrate.

SUMMARY OF THE INVENTION

The invention provides a method for the preparation of a printing plate comprising inkjet printing an oleophilic image on a surface of a support by applying to the support an aqueous solution or aqueous colloidal dispersion of a polymer having water-solubilising groups, wherein the water-solubilising groups interact with the surface of the support thereby binding the polymer to the support and rendering the polymer insoluble, characterised in that the aqueous solution or aqueous colloidal dispersion of polymer comprises pigment particles dispersed therein.

The invention also provides a composition suitable for the preparation of a printing plate by inkjet printing comprising an aqueous solution or aqueous colloidal dispersion of a polymer having water-solubilising groups, characterised in that said aqueous solution or aqueous colloidal dispersion further comprises pigment particles dispersed therein.

DETAILED DESCRIPTION OF THE INVENTION

The image on the surface of the printing plate is produced using an aqueous solution or aqueous colloidal dispersion of a polymer having water-solubilising groups. The image written to the printing plate becomes hydrophobic and ink-receptive to give a plate suitable for offset lithographic printing.

Preferably, the polymer comprises a substantially non-polar or hydrophobic backbone chain bearing pendant groups containing water-solubilising groups.

The water-solubilising groups and the support are chosen so that the water-solubilising groups interact with the surface of the support, thereby binding the polymer to the support. Various forms of interaction are possible, including chemical or physical interactions such as ionic interactions, covalent bonding, hydrogen bonding and the formation of coordination complexes. By interaction with the surface of the support, the groups lose their ability to confer water-solubility on the polymer and the polymer is rendered insoluble.

Suitable water-solubilising groups include ionisable acid groups e.g. carboxylic acid groups and sulfonic acid groups. The groups may be ionised so that the polymer is in the form of a salt. The salt may be an alkali metal or ammonium salt. The alkali metal may be sodium or potassium and the ammonium ion may be quaternised and may be, for example, a tetraalkyl ammonium ion such as tetramethyl or tetrabutyl ammonium.

The proportion of water-solubilising groups must be sufficient to confer water-solubility or water-dispersibility on the polymer, but low enough that the polymer when adsorbed on the printing plate gives an oleophilic surface. The proportion of free water-solubilising groups may be varied through the proportions of monomers used to form the polymer or by derivatising a fraction of the water-solubilising groups present in the polymer. For example, the proportion of free carboxylic acid groups may be varied by esterification.

The hydrophobic backbone may essentially be a hydrocarbon chain, as in polymers or copolymers prepared by the polymerisation of ethylenically unsaturated monomers. Examples of suitable monomers include ethylene, propylene, styrene, vinyl ethers, acrylamide, methacrylamide, acrylic acid, methacrylic acid, maleic acid, maleic anhydride and 2-acrylamido-2-methyl-propanesulfonic acid. Alternatively, the hydrophobic backbone may be another type of chain such as a polyester chain.

Suitable polymers include copolymers of ethylene and acrylic acid, and copolymers of styrene with acrylic or maleic acids.

Other suitable polymers, including short chain polymers known as oligomers, are described in WO/0037254 and WO/0037261.

Particularly preferred polymers are the sulfonated polyesters, e.g. sulfonated polyester AQ 55 S supplied by Eastman Chemical Corporation, and styrene-acrylate copolymers e.g. Jonrez IJ4655, supplied by Westvaco Corporation.

The concentration of polymer in the solution used in the inkjet printer may be in the range 0.02 to 8% by weight, with a preferred range of 0.2 to 3.0% by weight.

It is necessary that the polymer is in the form of an aqueous solution or a stable colloidal dispersion so that it can pass through the jets of the printer head.

It will be noted in direct contrast to the disclosure of U.S. Pat. No. 6,025,022 that the present invention uses a single coating composition or writing fluid in producing the required image. In particular, the method and composition of the invention do not make use of an aziridine and/or a catalyst.

The writing fluid used in the invention also contains a dispersed pigment which is in the form of a stable suspension in the aqueous medium. The particle size must be small enough so that it can pass through the jets of the printer head. Particle sizes in the range 10 to 100 nm are preferred, and especially in the range 20 to 50 nm.

A wide variety of organic and inorganic pigments, alone or in combination, may be selected for use in the present invention. Colorant particles which may be used in the invention include pigments as disclosed, for example, in U.S. Pat. Nos. 5,026,427; 5,086,698; 5,141,556; 5,160,370 and 5,169,436. The exact choice of pigments will depend upon the specific application and performance requirements, such as color reproduction and image stability. Pigments suitable for use in the present invention include, for example, an azo, monoazo, disazo, β-naphthol, naphthol AS, benzimidazolone, disazo condensation, metal complex, isoindolinone, isoindoline, polycyclic, phthalocyanine, quinacridone, perylene, perinone, thioindigo, anthrapyrimidone, flavanthrone, anthanthrone, dioxazine, triarylcarbonium, quinophthalone and diketopyrrolo pyrrole pigments, an azo pigment lake, titanium oxide, iron oxide and carbon black. Typical examples of pigments which may be used include Color Index (C.I.) Pigment Yellows 1–3, 5, 6, 10, 12–14, 16, 17, 62, 65, 73–75, 81, 83, 87, 90, 93–95, 97–101, 104, 106, 108–11, 113, 114, 116, 117, 120–124, 126–130, 133, 136, 138, 139, 147, 148, 150–155, 165–177, 179–185, 187, 188 and 190–194; C. I. Pigment Oranges 1, 2, 5, 6, 13, 15, 16, 17, 17:1, 19, 22, 24, 31, 34, 36, 38, 40, 43, 44, 46, 48, 49, 51, 59–62 and 64–69; C.I. Pigment Reds 1–18, 21–23, 31, 32, 38, 48:1, 48:2, 48:3, 48:4, 49:1, 49:2, 49:3, 50:1, 51, 52:1, 52:2, 53:1, 57:1, 60:1, 63:1, 66–68, 81, 95, 112, 114, 119, 122, 136, 144, 146–151, 164, 166, 168–172, 175–79, 181, 184, 185, 187, 188, 190, 192, 194, 200, 202, 204, 206, 207, 210–214, 216, 220, 222, 237–240, 242, 243, 245, 247, 248, 251–256, 258, 261 and 264; C.I. Pigment Violets 1–3, 5:1, 13, 19, 23, 25, 27, 29, 31, 32, 37, 39, 42, 44 and 50; C.I. Pigment Blues 1, 2, 9, 10, 14, 15:1, 15:2, 15:3, 15:4, 15:6, 15, 16, 18, 19, 24:1, 25, 56, 60–64 and 66; C.I. Pigment Greens 1, 2, 4, 7, 8, 10, 36 and 45; C.I. Pigment Blacks 1, 7, 20, 31 and 32 and C.I. Pigment Browns 1, 5, 22, 23, 25, 38, 41 and 42.

In a preferred embodiment of the invention, the pigment is C.I. Pigment Blue 15:3, C.I. Pigment Red 122, C.I. Pigment Yellow 155, C.I. Pigment Yellow 74, C.I. Pigment Black 7 or bis(phthalocyanylalumino)tetra-phenyldisiloxane, as described in U.S. Pat. No. 4,311,775. In an especially preferred embodiment of the invention, the pigment is Pigment Yellow 155.

The pigment may be present in the writing fluid used in the invention in any effective amount, generally from 0.1 to 10% by weight, and preferably from about 0.5% to about 6% by weight, based on the weight of the aqueous solution or aqueous colloidal dispersion of polymer.

While water is the preferred aqueous carrier medium, the aqueous composition may comprise one or more water-miscible solvents, e.g. a polyhydric alcohol such as ethylene glycol, diethylene glycol, triethylene glycol or trimethylol propane. The amount of aqueous carrier medium in the aqueous composition may be in the range from 30 to 99.995, preferably from 50 to 95% by weight.

Jet velocity, separation length of the droplets, drop size and stream stability are greatly affected by the surface tension and the viscosity of the aqueous composition. Inkjet writing fluids suitable for use with inkjet printing systems may have a surface tension in the range from 20 to 60, preferably from 30 to 50 dynes/cm. Control of surface tensions in aqueous writing fluids may be accomplished by the additions of a small amount of surfactant(s). The level of surfactant to be used can be determined through simple trial-and-error experiments. Anionic and nonionic surfactants may be selected from those disclosed in U.S. Patent Nos. 5,324, 349; 4,156,616 and 5,279,654 as well as many other surfactants known in the inkjet art. Commercial surfactants include the SURFYNOL™ range from Air Products; the ZONYL™ range from DuPont; the FLUORAD™ range from 3M and the AEROSOL™ range from Cyanamid.

The viscosity of the writing fluid is preferably no greater than 20 centipoise, e.g. from 1 to 10, preferably from 1 to 5 centipoise at room temperature.

The solution used in the inkjet printer may comprise other ingredients, for instance water-soluble liquids or solids with a substantially higher boiling point than water, e.g. ethanediol, diethylene glycol, triethylene glycol or other humectants, to help prevent the ink from drying out or crusting in the orifices of the print head. A biocide such as PROXEL™ GXL from Zeneca Colours may be added to prevent unwanted microbial growth which may occur in the ink over time. Additional additives which may optionally be present in the ink include thickeners, pH adjusters, buffers, conductivity-enhancing agents, anti-kogation agents, drying agents and defoamers.

The aqueous composition is employed in inkjet printing wherein drops of the composition are applied in a controlled fashion to the surface of the support by ejecting droplets from a plurality of nozzles or orifices in a print head of an inkjet printer.

Commercially available inkjet printers use several different schemes to control the deposition of the ink droplets. Such schemes are generally of two types: continuous stream and drop-on-demand.

In drop-on-demand systems, a droplet of ink is ejected from an orifice directly to a position on the ink receptive layer by pressure created by, for example, a piezoelectric device, an acoustic device or a thermal process controlled in accordance with digital signals. An ink droplet is not generated and ejected through the orifices of the print head unless it is needed. Inkjet printing methods and related printers are commercially available and need not be described in detail.

The aqueous composition may have properties compatible with a wide range of ejecting conditions, e.g. driving voltages and pulse widths for thermal inkjet printers, driving frequencies of the piezoelectric element for either a drop-on-demand device or a continuous device, and the shape and size of the nozzle.

The hydrophilic substrate may comprise any support suitable for printing plates. Typical supports include metallic and polymeric supports, e.g. sheets or foils. Alternatively, the support may be a paper-based support. The surface of the support may be treated or coated to provide the necessary interaction with the polymer. Examples of surface coatings include a metallic oxide and gelatin coatings.

One suitable class of substrate comprises a support having one or more layers on its surface wherein at least one of the layers is hydrophilic and comprises a crosslinked cationic polymer. Preferably, the hydrophilic layer is the outermost layer.

The cationic polymer may comprise amino groups selected from primary, secondary, tertiary and quaternary amino groups.

Preferred cationic polymers may be selected from the group consisting of polyalkylenepolyamines and alkylated derivatives thereof, products of addition of alkylcarboxylic acids and polyalkylenepolyamines, products of addition of ketones and polyalkylenepolyamines, products of addition of aldehydes and polyalkylenepolyamines, products of addition of isocyanates and polyalkylenepolyamines, products of addition of isothiocyanates and poly-alkylenepolyamines, products of addition of alkylene oxides and polyalkylene-polyamines and products of addition of polyalkylene oxide block copolymers and polyalkylenepolyamines.

A particularly preferred cationic polymer is polyethyleneimine.

The cationic polymer may be present in the hydrophilic layer in an amount from 0.01 to 10 g/m$^2$, preferably from 0.05 to 1.0 g/m$^2$.

The layer comprising the cationic polymer may further comprise inorganic particulate material. Examples of suitable inorganic particulate material include particulate silica, alumina, titanium dioxide and kaolin.

The inorganic particulate material may be present in an amount from 0.1 to 30 g/m$^2$, preferably from 0.5 to 10 g/m$^2$.

Such substrates are described in commonly assigned and copending U.S. patent application Ser. No. 10/628,192, entitled METHOD AND SUBSTRATE FOR THE PREPARATION OF A PRINTING PLATE by Michael J. Simons, filed herewith.

Another suitable class of substrate comprises a metallic support. Preferably, the metallic surface is oxidized.

In a particularly preferred embodiment of the invention, a support having an anodized aluminium surface is employed. Such a support is typically formed of aluminium which has been grained, for example by electrochemical graining, and then anodized, for example, by means of anodizing techniques employing sulfuric acid and/or phosphoric acid. Methods of both graining and anodizing are very well known in the art and need not be further described herein.

The following examples are provided to illustrate the invention. In the examples, all percentages are by weight unless otherwise specified.

EXAMPLE 1

Yellow Pigment Dispersion:

The yellow pigment used in the writing fluid of the present invention was prepared as follows: A mixture was prepared containing the following components: 8000 g polymeric beads, mean diameter 50 μm (milling media); 1600 g Pigment Yellow 155 (Clariant Corp.); 400 g oleoyl methyl taurine (OMT), potassium salt and 4880 g deionized water.

The above components were milled in a 40 l double-walled vessel, obtained from BYK-Gardner, using a high energy media mill manufactured by Morehouse-Cowles Hochmeyer. The mill was run for approximately 8 h at room temperature. The dispersion was separated from the milling media by filtering the mill grind through a 4–8 μm KIMAX™ Buchner Funnel obtained from VWR Scientific Products. An additional 8000 g dilution water was added to the filtered dispersion followed by a biocide, PROXEL™ GXL (Zeneca Corp.). The pigment is about 9.91% by weight of the total final dispersion and the biocide is about 230 ppm by weight of the total final dispersion. The median pigment particle size is about 38 nm, as measured by MICROTRAC II Ultrafine particle analyzer (UPA) manufactured by Leeds & Northrup.

Writing fluids were prepared by mixing together various quantities of a solution of the sulfonated polyester AQ55S (supplied by Eastman Chemical Corporation), as a 10.5% wt/wt solution in water, the yellow pigment dispersion and the humectants triethylene glycol and glycerol, as shown in the Table.

Each solution was applied using a small squirrel-hair paintbrush to a separate part of a grained, anodised aluminium plate so as to form a mark or pattern and allowed to dry. When the test pattern had dried, the resulting printing plate was mounted on the plate cylinder of a Heidelberg T-Offset printing press, the press rollers were inked up using fount solution (Varn International™ Universal Pink Fount Solution, diluted 1+15 with water) and K&E™ Novaquick 123W oil-based black ink and printing started. Clean prints were obtained from the first impression and the press run was continued until 6200 prints or impressions had been made. The number of impressions at which the test mark began to fade was noted and is recorded in the following Table.

| Solution number | 1 | 2 | 3 | 4 | 5 |
|---|---|---|---|---|---|
| Component | cm³ added | cm³ added | cm³ added | cm³ added | cm³ added |
| AQ55S sol.ⁿ(10.5%) | 1 | 1 | 1 | 1 | 1 |
| pigment dispersion | 0 | 0 | 2.5 | 2.5 | 2.5 |
| triethylene glycol | 0 | 1.5 | 0 | 1.5 | 1.5 |
| glycerol | 0 | 0.9 | 0 | 0 | 0.9 |
| water | 9 | 6.6 | 6.5 | 5 | 4.1 |
| Number of impressions | 2200 | 1200 | >6200 | >6200 | >6200 |

It was observed that the writing fluid compositions prepared according to the invention and containing the yellow pigment gave much better life on the press than the comparative compositions without pigment

EXAMPLE 2

This example used the yellow pigment dispersion described in Example 1, and a cyan pigment dispersion.

Cyan Pigment Dispersion

The cyan pigment dispersion was prepared similarly to the yellow pigment dispersion described in Example 1, except that Pigment Blue 15:3 (Clariant Corp.) was used instead of Pigment Yellow 155. The amount of OMT potassium salt was 25 wt. % based on the pigment. The pigment was about 9.97% by weight of the total final dispersion. The median pigment particle size was about 32 nm as measured by MICROTRAC II Ultrafine particle analyzer (UPA) manufactured by Leeds & Northrup.

Yellow Writing Fluid:

To prepare the yellow writing fluid, 24.97 g yellow pigment dispersion described in Example 1 (9.91% active), 0.2 g SURFYNOL™ 465 (Air Products Inc.), 8.40 g glycerol, 14.5 g triethylene glycol and 3.00 g di(propyleneglycol) methyl ether (DOWANOL™ DPM) and 9.52 g AQ55™ (10.5% active) were added together with distilled water so that the final weight of the ink was 100.0 g. The final ink contained 2.48% Pigment Yellow 155, 0.50% SURFYNOL™ 465, 8.40% glycerol, 14.5% triethylene glycol, 3% di(propylene-glycol) methyl ether and 1% AQ55™. The solution was filtered through a 3 μm polytetrafluoroethylene filter.

Cyan Writing Fluid:

To prepare the cyan writing fluid, 16.55 g of cyan pigment dispersion described above (9.97% active), 0.2 g SURFYNOL™ 465 (Air Products Inc.), 6.50 g glycerol, 18.7 g triethylene glycol and 3.50 g di(propyleneglycol) methyl ether (DOWANOL™ DPM) and 9.52 g AQ55™ (10.5% active) were added together with distilled water so that the final weight of the ink was 100.0 g. The final ink contained 1.65% Pigment Blue 15:3, 0.50% SURFYNOL™ 465, 6.50% glycerol, 18.70% triethylene glycol, 3.50% di(propyleneglycol) methyl ether and 1.0% AQ55™. The solution was filtered through a 3 μm polytetrafluoroethylene filter.

The black cartridge of a Lexmark Z43 inkjet printer was emptied, the plastic foam removed and residual ink washed out. It was refilled in turn with each of the above writing fluids with a wad of cotton wool in place of the foam. The cartridge was replaced in the printer and a test pattern was printed onto a sheet of hydrophilic substrate, which comprised polyethylene terephthalate photographic film base coated from aqueous solution with the following coverages of the stated substances:

| Cationic colloidal silica LUDOX CL ™ | 4.0 g/m² |
|---|---|
| Polyethyleneimine (used as a 5% w/w solution and adjusted to pH 6.5 with sulfuric acid) | 0.4 g/m² |
| bis(vinylsulfonyl)methane (hardener) | 0.024 g/m² |

The resulting imaged printing plates were mounted on a printing press and printed as described in Example 1. Good sharp prints having excellent resolution were obtained for plates made with each of the writing fluids and 4500 impressions were run without any loss or fading of the test pattern.

The invention has been described in detail with particular reference to certain preferred embodiments thereof, but it will be understood that variations and modifications can be effected within the spirit and scope of the invention.

The invention claimed is:

1. A method for the preparation of a printing plate comprising ink-jet printing an oleophilic image on a surface of a support by applying to the support an aqueous solution or aqueous colloidal dispersion of a polymer having water-solubilising groups wherein the water-solubilising groups interact with the surface of the support thereby binding the polymer to the support and rendering the polymer insoluble, characterised in that the aqueous solution or aqueous colloidal dispersion of polymer comprises pigment particles dispersed therein.

2. A method as claimed in claim 1 wherein the water-solubilising groups are ionisable acid groups.

3. A method as claimed in claim 2 wherein the water-solubilising groups are selected from the group consisting of carboxylic and sulfonic acid groups.

4. A method as claimed in claim 1 wherein the polymer is selected from polyesters and polymers prepared by the polymerisation of ethylenically unsaturated monomers.

5. A method as claimed in claim 1 wherein the polymer is a sulfonated polyester.

6. A method as claimed in claim 1 wherein the polymer is present in the aqueous solution or aqueous colloidal dispersion in the range 0.02 to 8% by weight.

7. A method as claimed in claim 1 wherein the pigment is selected from an azo, monoazo, disazo, β-naphthol, naphthol AS, benzimidazolone, disazo condensation, metal complex, isoindolinone, isoindoline, polycyclic, phthalocyanine, quinacridone, perylene, perinone, thioindigo, anthrapyrimidone, flavanthrone, anthanthrone, dioxazine, triarylcarbonium, quinophthalone and diketopyrrolo pyrrole pigment, azo pigment lake, titanium oxide, iron oxide and carbon black.

8. A method as claimed in claim 1 wherein the pigment is selected from C.I. Pigment Blue 15:3, C.I. Pigment Red 122, C.I. Pigment Yellow 155, C.I. Pigment Yellow 74, C.I. Pigment Black 7 and bis(phthalocyanylalumino)tetraphenyl disiloxane.

9. A method as claimed in claim 1 wherein the particle size of the pigment is in the range 10 to 100 nm.

10. A method as claimed in claim 1 wherein the pigment is present in an amount from 0.1 to 10% by weight, based on the weight of the aqueous solution or aqueous colloidal dispersion of polymer.

11. A method as claimed in claim 1 wherein the support is selected from metallic, paper-based and polymeric supports wherein the surface of the support is treated or coated to provide the necessary interaction with the polymer.

12. A method as claimed in claim 11 wherein the support is coated with a hydrophilic layer of a crosslinked cationic polymer.

13. A method as claimed in claim 11 wherein the support is metallic and has an oxidised surface.

14. A printing plate obtainable by a method as claimed in claim 1.

* * * * *